US011179989B2

(12) United States Patent
Che

(10) Patent No.: US 11,179,989 B2
(45) Date of Patent: Nov. 23, 2021

(54) TRIPHIBIAN VEHICLE

(71) Applicant: Yanjun Che, Niagara Falls (CA)

(72) Inventor: Yanjun Che, Niagara Falls (CA)

(73) Assignee: Yanjun Che, Niagra Falls (CA)

( * ) Notice: Subject to any disclaimer, the term of this patent is extended or adjusted under 35 U.S.C. 154(b) by 0 days.

(21) Appl. No.: 15/802,861

(22) Filed: Nov. 3, 2017

(65) Prior Publication Data

US 2021/0197636 A1   Jul. 1, 2021

(51) Int. Cl.
  *B60F 5/00* (2006.01)
  *B64C 37/00* (2006.01)
  *B60F 5/02* (2006.01)
  *B64C 29/00* (2006.01)

(52) U.S. Cl.
  CPC ............... *B60F 5/003* (2013.01); *B60F 5/02* (2013.01); *B64C 29/0033* (2013.01); *B64C 37/00* (2013.01)

(58) Field of Classification Search
  CPC .... B60F 5/003; B60F 5/00; B60F 5/02; B64C 37/00
  USPC .......................................................... 244/50
  See application file for complete search history.

(56) References Cited

U.S. PATENT DOCUMENTS

| 2,554,938 | A | * | 5/1951 | Catalano | B60F 3/00 244/102 R |
| 2,562,491 | A | * | 7/1951 | Hall | B64C 37/00 244/2 |
| 4,676,545 | A | * | 6/1987 | Bonfilio | B62D 21/00 114/357 |
| 4,986,493 | A | * | 1/1991 | Sarh | B60F 5/02 244/2 |
| 5,082,198 | A | * | 1/1992 | Patel | B64C 37/00 114/273 |
| 5,150,860 | A | * | 9/1992 | Young | B64F 1/10 244/50 |
| 5,909,857 | A | * | 6/1999 | Filimonov | B64C 29/0025 244/29 |
| 6,705,905 | B1 | * | 3/2004 | Tanaka | B64C 29/02 440/12.51 |
| 6,817,655 | B2 | * | 11/2004 | Durand | B62D 21/12 296/193.03 |
| 7,946,530 | B1 | * | 5/2011 | Talmage, Jr. | B64C 37/00 244/118.2 |
| 9,493,235 | B2 | * | 11/2016 | Zhou | G06Q 20/367 |
| 10,518,873 | B2 | * | 12/2019 | Netzer | B64C 29/0083 |

(Continued)

FOREIGN PATENT DOCUMENTS

DE   2620922 A1 * 11/1977 ............ B60F 5/02
DE   10120058 A1 * 10/2002 ............ B60F 5/00

(Continued)

*Primary Examiner* — Christopher P Ellis

(57) ABSTRACT

The present invention discloses a vertical take-off and landing triphibian flight vehicle, which can travel in land, water and air. The triphibian vehicle is based on the structure of an ordinary electric automobile. Its airscrew module is stored in the front and rear spaces of the triphibian vehicle body. The triphibian vehicle has land mode, air mode, water mode. These three modes are achieved by the positional changes of the airscrew module. The triphibian vehicle does not require the runway, which can take off and landing vertically. Its self-powered power supply provides the unlimited power to the triphibian vehicle itself, eliminating the need for charging, and no mileage restrictions.

20 Claims, 11 Drawing Sheets

(56) References Cited

U.S. PATENT DOCUMENTS

| | | | |
|---|---|---|---|
| 10,676,187 B2* | 6/2020 | Bernhardt | B64C 3/56 |
| 2002/0125367 A1* | 9/2002 | Killingsworth | B60F 5/00 |
| | | | 244/17.11 |
| 2011/0226174 A1* | 9/2011 | Parks | B60F 5/02 |
| | | | 114/313 |
| 2013/0112804 A1* | 5/2013 | Zhu | B64C 3/56 |
| | | | 244/2 |
| 2016/0023527 A1* | 1/2016 | Dietrich | B64D 35/02 |
| | | | 244/2 |
| 2017/0029106 A1* | 2/2017 | Chang | B64C 25/405 |
| 2017/0072755 A1* | 3/2017 | Zhou | B64C 35/008 |
| 2017/0197714 A1* | 7/2017 | Golden | B60F 5/02 |
| 2017/0300054 A1* | 10/2017 | Hanson | B63B 1/32 |
| 2018/0002016 A1* | 1/2018 | McCullough | B64C 27/30 |
| 2018/0257448 A1* | 9/2018 | Schreiner | B64C 37/00 |
| 2018/0354617 A1* | 12/2018 | Frolov | B64C 39/02 |
| 2019/0135422 A1* | 5/2019 | Al-Aani | B64D 7/00 |
| 2019/0291864 A1* | 9/2019 | Liu | B64C 39/024 |
| 2020/0346736 A1* | 11/2020 | Krasnoff | B64C 27/52 |
| 2021/0031913 A1* | 2/2021 | Martel | B64D 27/24 |

FOREIGN PATENT DOCUMENTS

| | | | | |
|---|---|---|---|---|
| GB | 475057 A | * | 11/1937 | B64C 37/00 |
| WO | WO-2011146349 A2 | * | 11/2011 | B64D 25/00 |
| WO | WO-2015179624 A1 | * | 11/2015 | B64C 39/024 |

* cited by examiner

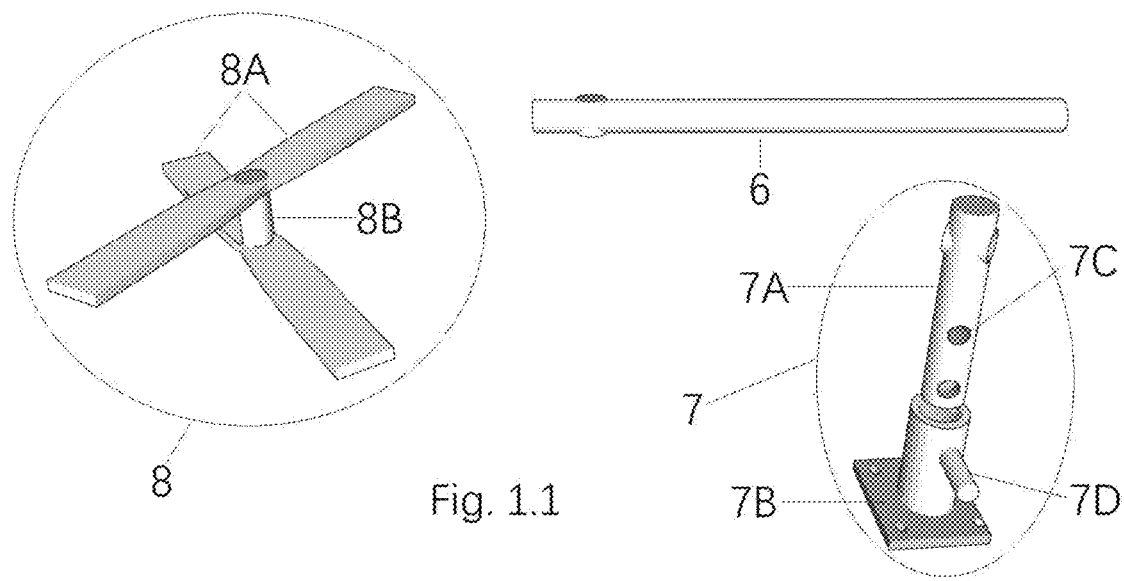
Fig. 1.1
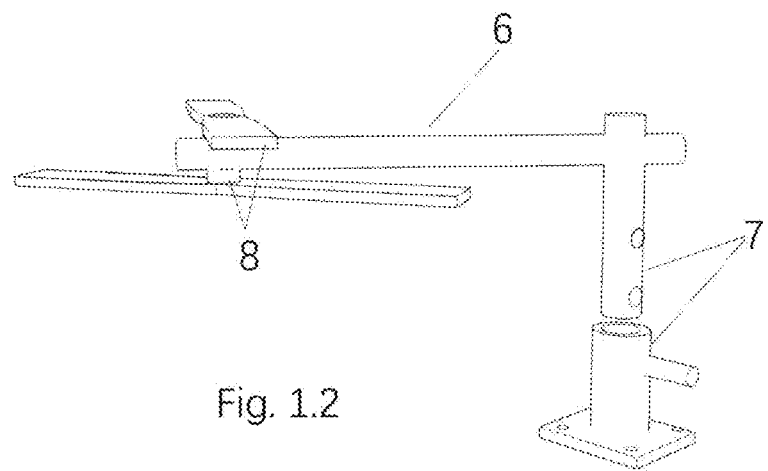
Fig. 1.2

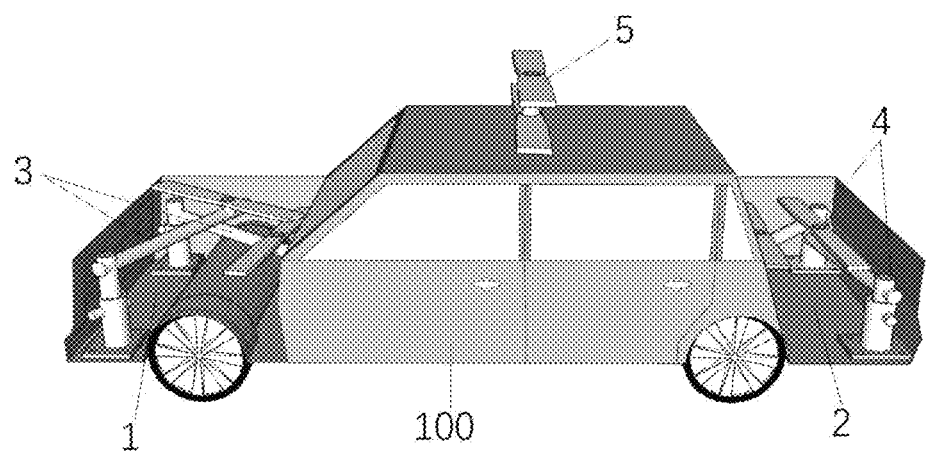
Fig. 1.3
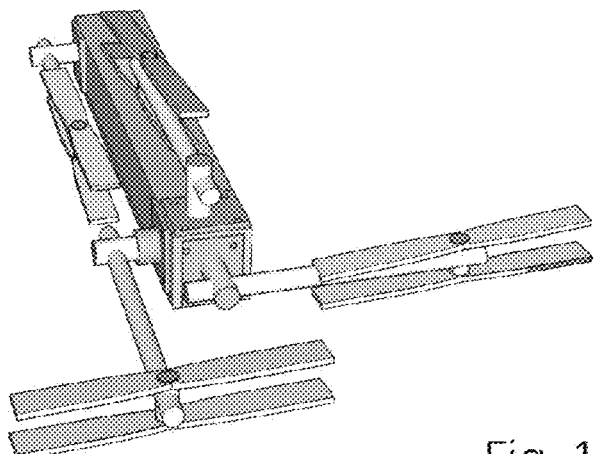
Fig. 1.4

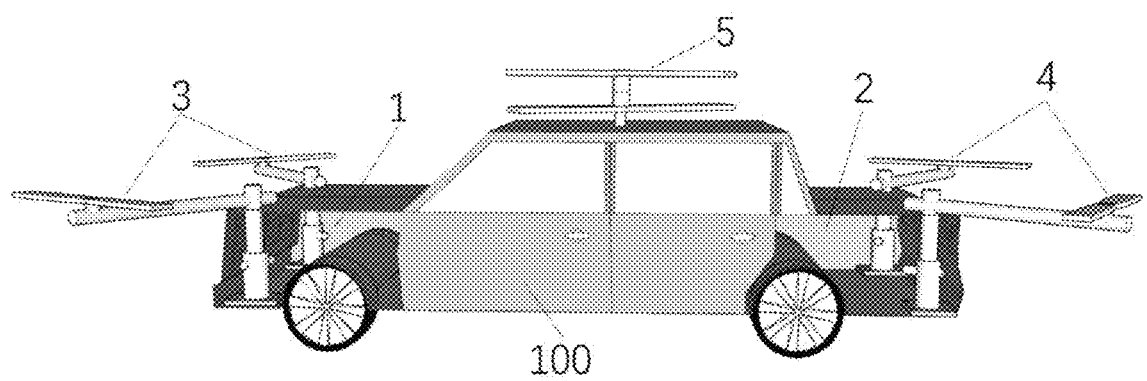
Fig. 3.1

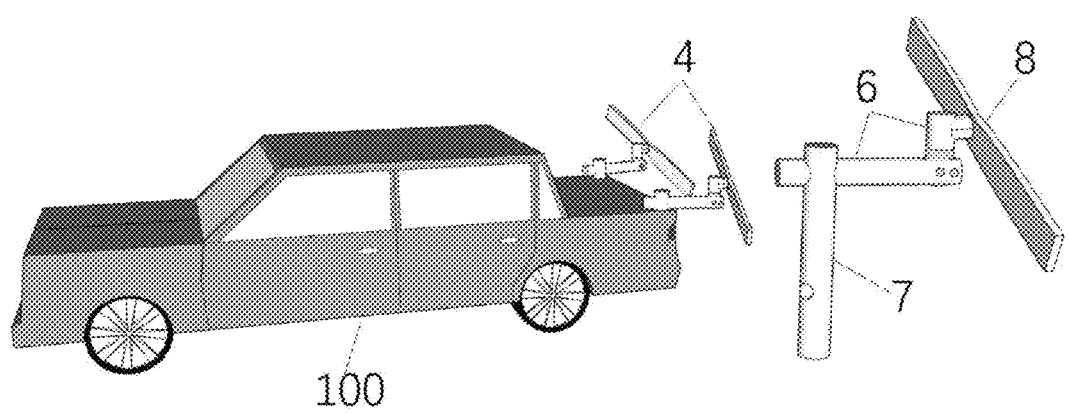
Fig. 4.1

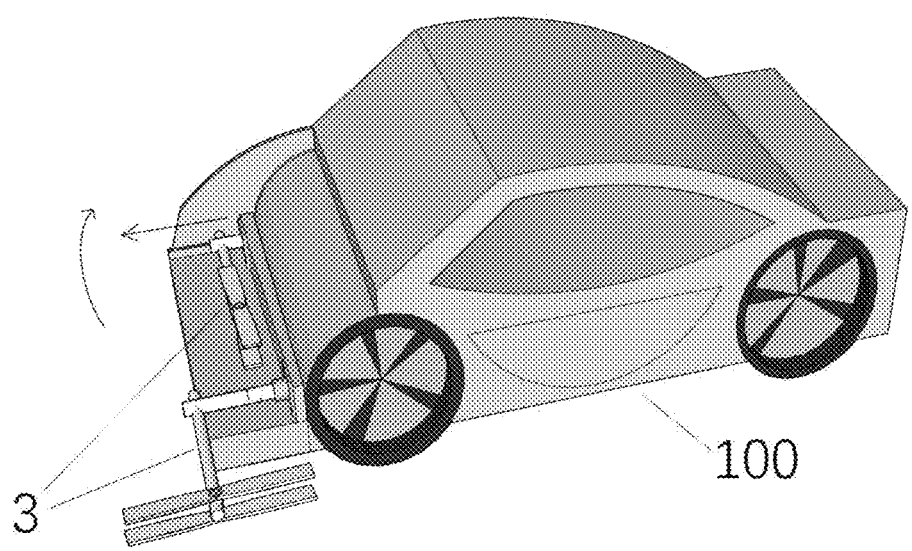
Fig. 5.1

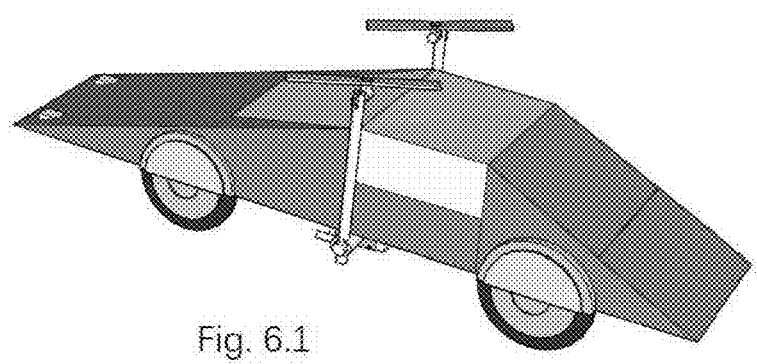
Fig. 6.1
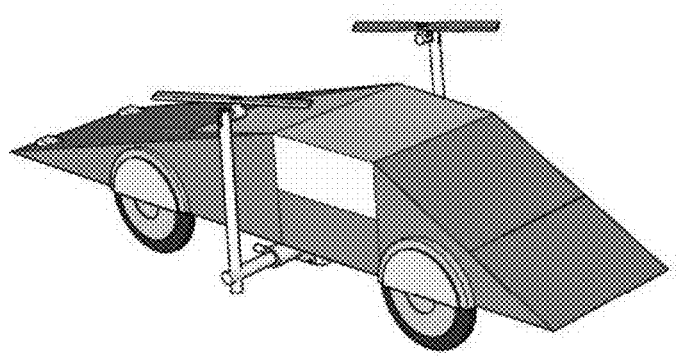
Fig. 6.2
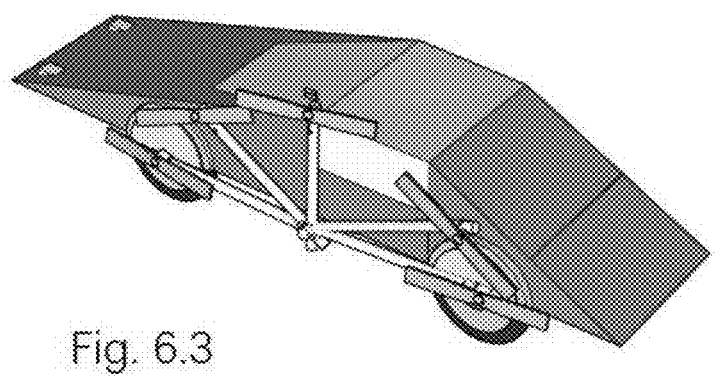
Fig. 6.3

TRIPHIBIAN VEHICLE

BACKGROUND OF THE INVENTION

A. Field of the Invention

The invention is a triphibian vehicle that may travel in land, water and air. The triphibian vehicle mainly includes an airscrew module and self-power battery device. The triphibian vehicle is based on the structure of existing vehicle, its airscrew module can be stored inside the triphibian vehicle. The self-power battery device can provide the unlimited power for the triphibian vehicle in a real time.

B. The Description of the Related Art

The prior art does not teach the airscrew modules that can be stored inside the triphibian vehicle and the triphibian vehicle has a self-power battery device.

BRIEF DESCRIPTION OF THE INVENTION

The present invention is a triphibian vehicle based on the electric vehicle structure which can travel in land, water and air. The triphibian vehicle have three operating modes, that is the land mode, the air mode and the water mode, which can be converted to each other. An airscrew module as a propeller is set up in the triphibian vehicle for traveling in air and water. The self-powered battery of the triphibian vehicle replaces the current rechargeable battery to reduce the weight of the vehicle. There are the cabins set up in the triphibian vehicle for collecting the airscrew module to support the land work mode, so that when the triphibian vehicle travels in the land, it can be an ordinary electric car. The working mode of the vehicle can be determined by the position of the airscrew module, and the mutual transformation of the three working modes is achieved by the position change of the airscrew module. An airscrew is set up at the top of the triphibian vehicle to ensure a safe and stable flight. The triphibian vehicle as an aircraft, it can be vertical takeoff and landing for transporting people or objects.

The Accommodating Space

A vehicle has an accommodating space for storing the airscrew module assemblies at front and rear. The vehicle as an ordinary car travel in the land when the airscrew module assemblies are stored inside the accommodating space; when the airscrew module assembly rotates out of the accommodating space, the vehicle can travel in air or on water.

The Self-Powered Battery

The self-powered battery is a hydraulic battery or a magnetic power battery or a gravity battery that generates power using fluid pressure, which uninterruptedly converts the natural energy into electricity to provide unlimited power in a real time for the triphibian vehicle. The self-powered battery replaces the rechargeable battery to reduce the weight of the vehicle, increase the load capacity of the triphibian vehicle.

The Airscrew Module Assemblies

An airscrew module assembly comprises a propeller assembly, a retractable shaft assembly, and an extension arm member. Wherein, the propeller assembly includes at least one propeller blade and a motor, the retractable shaft assembly includes a retractable rod and a base with positioning holes and positioning screws. In some embodiments, the extension arm member can be an extension assembly. An airscrew module assembly is capable of rotating relative to the vehicle body to selectively rotate into or out of the accommodating space. When an airscrew module assembly is inside the accommodating space, the vehicle is in land mode; when an airscrew module assembly rotates out of the accommodating space, the vehicle is in air mode or water mode; Preferably, a propeller assembly is configured on the top of vehicle, it provides flight stability and safety for the vehicle.

Preferably, an airscrew module assembly may be configured with a module control system to make the airscrew module assembly rotate automatically into or out of the accommodating space. Further, a module control system may be coupled to different positions on the vehicle body.

In an embodiment, referring to FIGS. 1.1, 1.2 1.3 and 1.4, there are two first airscrew module assemblies 3 coupled to the accommodating space 1 of the vehicle body 100 and two second airscrew module assemblies 4 are coupled to the accommodating space 2 of the vehicle body 100, and one propeller assembly 5 coupled to the top of the vehicle body 100. Wherein, each airscrew module assembly includes an extension member 6 coupled to the retractable shaft assembly 7, a retractable shaft assembly 7 coupled to the vehicle body 100, and a propeller assembly 8 coupled to the extension arm member 6. Wherein a retractable shaft assembly 7 includes a retractable rod 7A and a base 7B with positioning holes 7C and positioning screws 7D, and a propeller mold assembly 8 includes at least one propeller blade 8A and a motor 8B. Each airscrew module assembly is capable of rotating relative to the vehicle body to selectively rotate into or out of the accommodating spaces. When the propeller assembly 8 rotates horizontally, the lift provided by the propeller can make the vehicle take off and land vertically. In another embodiment, referring to FIGS. 4 and 4.1, the airscrew module assemblies are in water mode, two first airscrew module assemblies (not shown) and two second airscrew module assemblies rotate at an oblique or vertically level, the propulsion provided by the propeller allows the vehicle to travel in water.

In the present case, these components are illustrated in sketch form; for the concern of this invention is with the applicability of essentially the same modular structure to water and air vehicles, not with the structural details of the components.

Preferably, an airscrew module assembly may be configured with a module control system 9 to make the airscrew module assembly rotate automatically into or out of the accommodating space relative to the vehicle body. Further, a module control system may be coupled to different positions on the vehicle body.

The position of the airscrew module assembly is variable in the triphibian vehicle for travelling in air, land and water. The movement, rise, fall and the change in the rotation angle of the airscrew module assembly, all of which are achieved by the extension arm member, retractable shaft assembly and module control system. The conversion of the triphibian vehicles from land to air flight does not require any space, the module control system moves the position of the airscrew module to achieve the conversion mode of the triphibian vehicles. Air mode, when the airscrew module moves outside the cabin, which can be as a propeller to allow the triphibian vehicle vertical takeoff and landing in land and traveling in water.

The triphibian vehicles can be autopilot and unmanned. As used in this document, the term "autopilot" means that the triphibian vehicle may take-off, fly and land under the control of an autopilot control system. As used in this document, the term "unmanned" means that the triphibian vehicle does not accommodate a human pilot, although a human operator may program the autopilot control system prior to flight, including selection of a mission plans, waypoints and a landing zone. During flight, a human operator also may select or change the mission plan, waypoints and landing point from a remote station or may control the airscrew module remotely.

Ducted Fan

The airscrew module may use any configuration of known rotating wings in the field of aircraft to support aircraft in flight or to navigate in water. Optionally, the airscrew module is equipped with four conduit fans connected to the vehicle body. Each channel fan type includes a circular pipe around the rotor.

Land Mode

In an embodiment, the vehicle is in land mode. Referring to FIGS. 1.1, 1.2 1.3 and 1.4, two first airscrew module assemblies 3 coupled to the accommodating space 1 of the vehicle body 100, each first airscrew module assemblies includes an extension arm member 6, a retractable shaft assembly 7 and a propeller assembly 8; Two second airscrew module assemblies 4 coupled to the accommodating space 2 of the vehicle body 100, each second airscrew module assemblies includes an extension arm member 6, a retractable shaft assembly 7 and a propeller assembly 8; when the two first airscrew module assemblies 3 and the two second airscrew module assemblies 4 are respectively stored in the accommodating space 1 and the accommodating space 2, the vehicle is in land mode and is used on the road as an ordinary vehicle. Each airscrew module assembly is capable of rotating relative to the vehicle body to selectively rotate into or out of the accommodating spaces. Preferably, a propeller assembly 5 is configured on the top of vehicle, it provides flight stability and safety for the vehicle.

Preferably, an airscrew module assemblies may be configured with a module control system 9 to make the airscrew module assembly rotate automatically into or out of the accommodating space relative to the vehicle body.

Air Mode

In an embodiment, the vehicle is in air mode. Referring to FIGS. 3 and 3.1, two first airscrew module assemblies 3 coupled to the accommodating space 1 of the vehicle body 100, each first airscrew module assemblies includes an extension arm member 6, a retractable shaft assembly 7 and a propeller assembly 8; Two second airscrew module assemblies 4 coupled to the accommodating space 2 of the vehicle body 100, each second airscrew module assemblies includes an extension arm member 6, a retractable shaft assembly 7 and a propeller assembly 8; while the two first airscrew module assemblies 3 and the two second airscrew module assemblies 4 are respectively rotated out of the accommodating space 1 and the accommodating space 2 and the propellers rotate horizontally, the vehicle is in flight mode, and the lift provided by the propeller allows the vehicle to directly take off and land vertically.

Preferably, a propeller assembly 5 is configured on the top of vehicle, it provides flight stability and safety for the vehicle.

Preferably, an airscrew module assemblies may be configured with a module control system 9 to make an airscrew module assembly rotate automatically into or out of the accommodating space relative to the vehicle body.

Water Mode

In an embodiment, the vehicle is in water mode. Referring to FIGS. 4 and 4.1, two first airscrew module assemblies 3 coupled to the accommodating space 1 of the vehicle body 100 (not shown); Two second airscrew module assemblies 4 coupled to the accommodating space 2 of the vehicle body 100, each first and second airscrew module assembly includes an extension arm assembly 6, a retractable shaft assembly 7 and a propeller assembly 8. The two first airscrew module assemblies 3 (not shown) and the two second airscrew module assemblies 4 respectively rotates out of the accommodating space 1 and the accommodating space 2, and at least one propeller rotates at an angle that is inclined or perpendicular to the horizontal plane, the driving force provided by the propeller can enable the vehicle to travel on water.

Preferably, an airscrew module assemblies may be configured with a module control system 9 to make an airscrew module assembly rotate automatically into or out of the accommodating space relative to the vehicle body.

The Propeller Assembly

A propeller assembly is arranged at the top of the center of the vehicle body, and the propeller assembly has at least two blades, which may have both working and non-working conditions. When the vehicle is in land mode, the blades are in a non-working state and the blades are folded horizontally or longitudinally on the vehicle body to reduce drag. On the contrary, when the vehicle is in air mode, the blades are in a working state they become a loose working condition, providing balance and up force for the triphibian vehicle or as a parachute for safe landing.

Vertical Takeoff and Landing

When the two first and second airscrew modules are outside the vehicle body which are in series connection or parallel connection, the triphibian vehicle enters the air mode, and the airscrew can provide vertical takeoff and landing when horizontally rotating.

Flight Control

When the triphibian vehicle is flying, the two second airscrew modules apply a reverse torque to the aircraft to control the flight direction by tilting at a certain angle of rotation.

The Autopilot Control System of the Triphibian Vehicle

The autopilot control system includes a microprocessor, a computer memory, a sensor, and a control effector. The autopilot control system allows the task plan to be pre-programmed into the computer's memory, including the waypoint and landing location. The operator may change the mission plan, waypoint, or landing location during the flight.

BRIEF DESCRIPTION OF THE DRAWINGS

FIG. 1.1 shows in sketch form an essential airscrew module assembly in accordance with the invention; FIG. 1.2 shows an assembled structure of an airscrew module assembly; FIG. 1.3 illustrates a land mode of a vehicle which incorporates the modular structure; FIG. 1.4 is a schematic view showing the connection between a module control system and an airscrew module assembly at different positions. According to the needs of different modes of a vehicle, an airscrew module assembly can be configured in different positions on a module control system.

FIG. 3.1 illustrates an air mode of vehicle which incorporates the modular structure. The airscrew module assemblies rotate out of the accommodating space to reach a predetermined position, and the vehicle is in flight mode.

FIG. 4.1 shows assembled structure of an airscrew module assembly in water mode. Wherein the extension arm assembly 6 are connected to the retractable shaft 7, and the propeller assembly 8 are coupled on the extension arm assembly 6, and the propeller rotates vertically to provide propulsion for the vehicle so that the vehicle can travel in water.

FIG. 5.1 is a view of the airscrew module assemblies being disposed at the rear of the vehicle; the accommodating space is open without a cover. The airscrew module assemblies being disposed at the front of the vehicle is not shown.

FIG. 6.1 is schematic view of at least one airscrew module assembly being disposed on each side of the vehicle in land mode. FIG. 6.2 is schematic view of at least one airscrew module assembly being disposed on each side of the vehicle in air mode or water mode. FIG. 6.3 is a side view of the airscrew module assembly stored in different positions on the side of vehicle body in land mode.

DESCRIPTION OF AN EMBODIMENT

Figure 1:
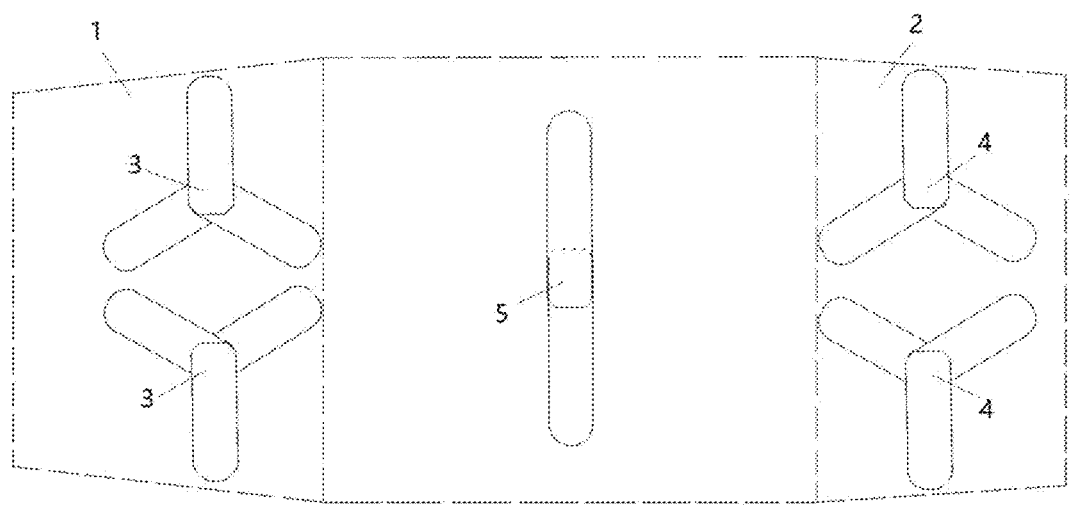
FIG. 1 is a schematic view of the position of accommodating space 1, an accommodating space 2, an airscrew module assembly 3, an airscrew module assembly 4 and a propeller assembly 5 in a land mode of the vehicle.
Figure 2:
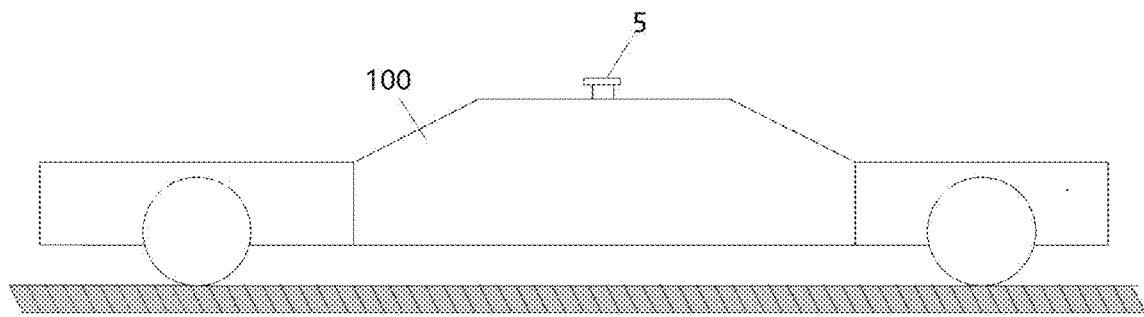
FIG. 2 is a schematic view of a vehicle as an ordinary vehicle traveling in land, an airscrew assembly 5 is disposed on the top of vehicle body 100 for safety purpose.

The present invention is a triphibian vehicle that can travel in land, water and air, comprising a basic structural feature of an existing automobile, which is characterized in that at least one of the said airscrew module driven by electric power in the triphibian vehicle, and the three transport functions of the land, air, and water modes are achieved by the airscrew modules at various positions. The triphibian vehicle is powered by a self-powered battery to provide unlimited mileage to reduce the need for many rechargeable batteries, achieving the purpose of reducing the weight of the vehicle, obtaining the maximum up force and carrying capacity.

According to an embodiment, the disclosure provides a vehicle. The vehicle includes a self-powered battery (not shown) is coupled to the vehicle body 100, two first airscrew module assemblies 3 are coupled to the accommodating space 1 at the front of the vehicle body and two second airscrew module assemblies 4 are coupled to the accommodating space 2 at the rear of the vehicle body; each airscrew module assembly includes a retractable shaft assembly 7 coupled to the vehicle body 100, an extension arm member 6 coupled to the retractable shaft assembly 7 and a propeller assembly 8 coupled to the extension arm member 6; wherein a propeller assembly 8 has at least one blade; a propeller assembly 5 is coupled to the top of the vehicle body 100 and the blades of the propeller is secured laterally or longitudinally to reduce wind resistance in land mode. It should be understood that the blades of the propeller assembly 8 can be folded and other forms, the purpose is to make the blades fit into accommodating space, so as not to affect the exercise of the vehicle on the road.

Further, refer to FIG. 1.4, preferably, a module control system can be configured on an airscrew module assembly. An airscrew module assembly can be coupled to the different positions on a module control system. So that the airscrew module assemblies can be automatically controlled.

How the Triphibian Vehicle Works:

Land Mode:

According to an embodiment, referring to 1.1 to 1.4, the disclosure provides a vehicle. The vehicle includes two first airscrew module assemblies 3 and two second airscrew module assemblies 4 are respectively housed in accommodating space 1 and accommodating space 2 of the vehicle body 100, they are in a non-working state, at this time the vehicle is a general vehicle; The blade of the safety airscrew assembly 5 is configured to the top of the vehicle body 100; The self-powered battery provides power to the motor, and then the motor drives the hub to allow the triphibian vehicle traveling in land.

Referring to FIGS. 1.1 to 1.4, taking the first airscrew module assembly 3 stored in the accommodating space 1 as an example, the first airscrew module assembly 3 comprises a retractable shaft assembly 7, an extension arm member 6, and a propeller assembly 8 having at least one blade, wherein the airscrew module assembly is capable of rotating relative to the vehicle body to selectively rotate into or out of the accommodating space; the retractable shaft assembly 7 is coupled to the vehicle body 100, wherein the retractable shaft assembly 7 comprises a retractable rod 7A and a base 7B. The retractable rod 7A can be raised, lowered and rotatable. The base 7B has some positioning holes 7C and a positioning screw 7D. The positioning screw 7D is used to fix retractable rod 7A at a predetermined height; The extension arm member 6 is coupled to the rotatable retractable shaft assembly 7, and the propeller assembly 8 is coupled to the extension arm member 6; As shown in FIG. 1.3, two first airscrew module assemblies 3 stored in the accommodating space 1. The propeller assembly 5 is coupled to the top of the vehicle.

Further, the structure, connection and installation of the second airscrew module assembly 4 stored in the accommodating space 2 are the same as those of the first airscrew module assembly 3 described above.

Further, preferably, a module control system can be configured on an airscrew module assembly, so that an airscrew module assembly can be automatically controlled.

Figure 3:
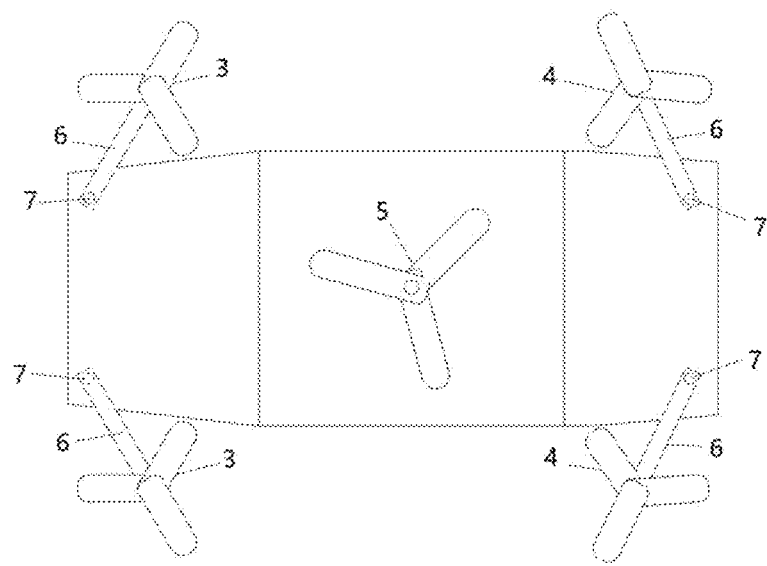
FIG. 3 is a schematic diagram of an air mode of the vehicle, wherein the airscrew module assemblies 3 and the airscrew module assemblies 4 respectively rotate out of the accommodating space; the retractable shafts 7 are coupled to the vehicle body, the extension arms member 6 are connected to the retractable shafts 7, and the propeller assemblies 8 are coupled to the extension arms member 6, the propeller assembly 5 is disposed on the top of vehicle body 100; the propeller assemblies 8 and the propeller assembly 5 rotate horizontally.

Air Mode:

According to one embodiment, the disclosure provides the following steps for the vehicle to switch from land mode to flight mode. An air mode illustrated in FIG. 3.1. Open the covers of the accommodating space 1 and 2 respectively, adjust the four retractable shaft assemblies 7 to a predetermined height, then fix them with the positioning screws 7D, and move the four extension arm members 6 having the propeller assemblies 8 out of the accommodating spaces 1 and 2, when reaching an optimal flight position relative to the vehicle body and stop, the blades of the propeller assemblies 8 will rotate horizontally, unlock the blades of the propeller assembly 5 to make it rotatable, and supply power to the propeller motor, the blades of the propeller assemblies 8 and the blades of the propeller assembly 5 start to rotate to provide ascending power, and the vehicle is switched from land mode to flight mode. Referring to FIG. 3.1, the four airscrew module assemblies 3 and 4 rotate out of accommodating space, so that the vehicle can fly in the air.

Further, preferably, a module control system can be configured on an airscrew module assembly and a propeller assembly 5, so that an airscrew module assembly and a propeller assembly can be automatically controlled.

Figure 4:
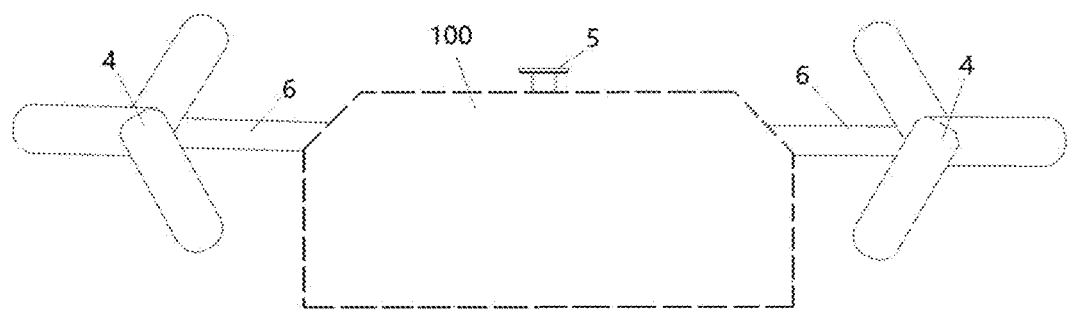
FIG. 4 is a schematic view of the water mode of vehicle, the airscrew module assemblies 4 vertically rotate to push the operation of the vehicle 100, wherein the airscrew module assemblies 4 rotate out of the accommodating space to reach a predetermined position, the airscrew assembly 5 is coupled to the top of the vehicle body 100 and secured parallelly relative to the vehicle body, and the airscrew module assemblies 4 include an extension arm assembly 6, a retractable shaft 7 and a propeller assembly 8; the retractable shaft 7 are coupled to the vehicle body 100, the extension arm assembly 6 is connected to the retractable shaft 7, propeller assembly 8 is coupled to the extension arm assembly 6; the airscrew module assemblies rotate out of the accommodating space to reach a predetermined position.

Water Mode:

According to one embodiment, the disclosure provides the following steps for the vehicle to switch from land mode to water mode. Open the covers of the accommodating space 1 and 2 respectively, adjust the four retractable shaft assemblies 7 to a predetermined height, then fix them with the positioning screws 7D, and move the four extension arm assemblies 6 having the propeller assemblies 8 out of the accommodating spaces 1 and 2, when reaching an optimal operating position relative to the vehicle body and stop, and adjust the extension arm assemblies 6 to make the propeller assemblies 8 rotate vertically, lock the blades of the safety propeller module 5, and supply power to the propeller motor, the blades of the propeller assemblies 8 start to rotate vertically to provide forward power, close the cover and the vehicle is switched from land mode to water mode and ready to travel in water. Referring to FIG. 4.1, the four airscrew module assemblies 3 and 4 are rotated out of accommodating space, and so that the vehicle can travel in water.

Further, preferably, a module control system can be configured on an airscrew module assembly and a safety propeller module, so that an airscrew module assembly and a propeller assembly 5 can be automatically controlled.

Air Mode to Land Mode

According to an embodiment, the disclosure provides the following steps for the vehicle to switch from air mode to land mode. Open the covers of the accommodating space 1 and 2 respectively; move the four extension arms 6 having the propeller assemblies 8 into the accommodating spaces 1 and 2; adjust the propeller assemblies 8 to fit for the accommodating spaces; lower the four retractable shaft assemblies 7, then fix them with the positioning screws 7D; close the cover and lock the blades of the safety propeller module 5, and the vehicle is switched from air mode to land mode.

Further, preferably, a module control system may be configured on an airscrew module assembly and a safety propeller module, so that an airscrew module assembly and a safety propeller module can be automatically controlled.

Water Mode to Land Mode

According to an embodiment, the disclosure provides the following steps for the vehicle to switch from water mode to land mode. Open the covers of the accommodating space 1 and 2 respectively; move the four extension arm member 6 having the propeller assemblies 8 into the accommodating spaces 1 and 2; adjust the propeller assemblies 8 to fit for the accommodating spaces; lower the four retractable shaft assemblies 7, then fix them with the positioning screws 7D; close the cover and lock the blades of the safety propeller module 5, and the vehicle is switched from air mode to land mode.

Further, preferably, a module control system may be configured on an airscrew module assembly and a safety propeller module, so that an airscrew module assembly and a safety propeller module can be automatically controlled.

Water Mode to Air Mode

The disclosure provides the following steps for the vehicle to switch from water mode to air mode. Unlock the blades of the propeller assembly 5 to make it rotatable, and adjust the propeller assemblies 8 to switch from vertical rotation to horizontal rotation to provide ascending power, so that the vehicle is switched from water mode to air mode and the vehicle can fly in the air.

Air Mode to Water Mode

The disclosure provides the following steps for the vehicle to switch from air mode to water mode. Lock the blades of the propeller assembly 5, and adjust the propeller assemblies 8 to switch from horizontal rotation to vertical rotation to provide forward power, so that the vehicle is switched from air mode to water mode and the vehicle can travel on the water.

Further, preferably, a module control system can be configured on an airscrew module assembly and a safety propeller module, so that an airscrew module assembly and a safety propeller module can be automatically controlled.

Figure 5:
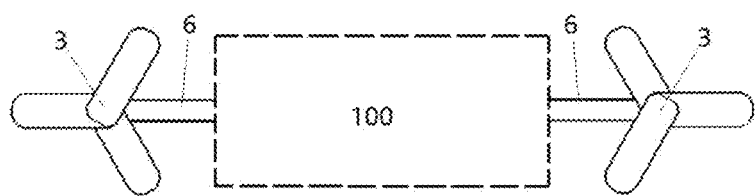
FIG. 5 is schematic view of at least two airscrew module assemblies being respectively disposed at the front and back of the vehicle.

As shown in FIG. 5, at least two airscrew module assemblies are configured in the vehicle body in embodiment B.

According to an embodiment, referring to FIGS. 5 and 5.1, the disclosure provides a vehicle. The vehicle includes a self-powered battery (not shown) is coupled to the vehicle body 100, the accommodating spaces 1 and 2 are respectively disposed at the front and rear of the vehicle body 100. The accommodating spaces are open, without the covers; two airscrew module assemblies are respectively disposed at the accommodating spaces 1 and 2; each airscrew module assembly includes a retractable shaft assembly 7 coupled to the vehicle body 100 (not shown), an extension arm member 6 coupled to the retractable shaft assembly 7 and a propeller assembly 8 coupled to the extension arm member 6; wherein a propeller assembly 8 has at least one blade; optionally, a propeller assembly 5 is coupled to the top of the vehicle body 100 (not shown) and the blades of the propeller is secured laterally or longitudinally to reduce wind resistance in land mode. It should be understood that the blades of the propeller assembly 8 can be folded and other forms, the purpose is to make the blades fit into accommodating space, so as not to affect the exercise of the vehicle on the road.

Further, preferably, an airscrew module assembly may be disposed with a modular control system to control a movement of the airscrew module assembly; wherein the airscrew module assemblies may be disposed at different positions on the modular control system.

How the Triphibian Vehicle Works:

Air Mode:

According to an embodiment, the disclosure provides the following steps for the vehicle to switch from land mode to air mode. Referring FIG. 5.1, taking the airscrew module assemblies 3 at rear of vehicle as an example: adjust the retractable shaft assemblies 7 to a predetermined position, then fix them with the positioning screws 7D (not shown), and move the extension arm member 6 having the propeller assemblies 8 out of the accommodating spaces, when reaching an optimal flight position relative to the vehicle body and stop, the propeller assemblies 8 will rotate horizontally, unlock the blades of the safety propeller module 5 to make it rotatable (not shown), and supply power to the propeller motor, the propeller assemblies 8 and the safety propeller module 5 start to rotate to provide ascending power, and the vehicle is switched from land mode to flight mode. So that the vehicle can fly in the air.

Further, preferably, a module control system may be configured on an airscrew module assembly and a safety propeller module, so that an airscrew module assembly and a safety propeller module can be automatically controlled.

Water Mode:

According to an embodiment, the disclosure provides the following steps for the vehicle to switch from land mode to water mode. Referring FIG. 5.1, taking the airscrew module assemblies 3 at rear of vehicle as an example: adjust the retractable shaft assemblies 7 to a predetermined position, then fix them with the positioning screws 7D (not shown), and move the extension arm member 6 having the propeller assemblies 8 out of the accommodating spaces, when reaching an optimal position relative to the vehicle body and stop, adjust the propeller assemblies 8 to make the blades rotate vertically to provide forward power, the vehicle is switched from land mode to water mode traveling in water.

Further, preferably, a module control system may be configured on an airscrew module assembly, so that an airscrew module assembly can be automatically controlled.

Figure 6:
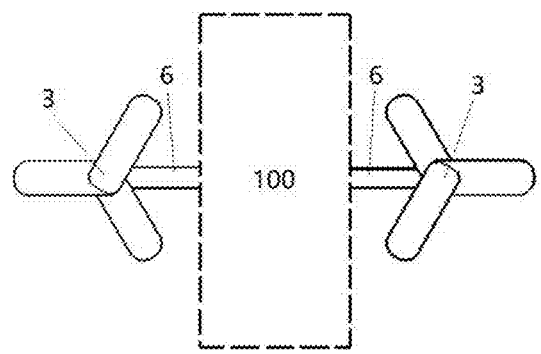
FIG. 6 is schematic view of at least two airscrew module assemblies being respectively disposed on the left side and right side of the vehicle.

As shown in FIG. 6, at least two airscrew module assemblies are configured in the vehicle body in embodiment C.

According to an embodiment, referring to FIGS. 6 and 6.1, the disclosure provides a vehicle. The vehicle includes a self-powered battery (not shown) is coupled to the vehicle body 100; two airscrew module assemblies are respectively disposed at both left and right side of vehicle body; each airscrew module assembly includes a retractable shaft assembly 7 (not shown) coupled to the vehicle body 100, an extension arm member 6 (not shown) coupled to the retractable shaft assembly 7 and a propeller assembly 8 (not shown) coupled to the extension arm member 6 (not shown); wherein a propeller assembly 8 has at least one blade; optionally, a propeller assembly 5 is coupled to the top of the vehicle body 100 (not shown) and the blades of the propeller is secured laterally or longitudinally to reduce wind resistance in land mode. It should be understood that the blades of the propeller assembly 8 may be folded and other forms, so as not to affect the exercise of the vehicle on the road.

Further, preferably, an airscrew module assembly may be disposed with a modular control system to control a movement of the airscrew module assembly; wherein the airscrew module assemblies may be disposed at different positions on the modular control system.

Air Mode:

According to an embodiment, the disclosure provides the following steps for the vehicle to switch from land mode to air mode. Referring FIGS. 6.1,6.2 and 6.3, adjust the retractable shaft assemblies 7 to a predetermined position, then fix them with the positioning screws 7D (not shown), and move out the extension arm member 6 relative to the vehicle body to reach an optimal flight position and stop, the propeller assemblies 8 rotate horizontally, and supply power to the propeller motor, the propeller assemblies 8 starts to rotate to provide ascending power, and the vehicle is switched from land mode to flight mode. So that the vehicle can fly in the air.

Further, preferably, a module control system may be configured on an airscrew module assembly and a safety propeller module, so that an airscrew module assembly and a safety propeller module can be automatically controlled.

Water Mode:

According to an embodiment, the disclosure provides the following steps for the vehicle to switch from land mode to water mode. Referring FIGS. 6.1,6.2 and 6.3, adjust the retractable shaft assemblies 7 to a predetermined position, then fix them with the positioning screws 7D (not shown), and move out the extension arm member 6 relative to the vehicle body to reach an optimal flight position and stop, the propeller assemblies 8 rotates vertically to provide forward power, the vehicle is switched from land mode to water mode traveling in the water.

Further, preferably, a module control system may be configured on an airscrew module assembly, so that an airscrew module assembly can be automatically controlled.

A method for converting the triphibian hybrid transportation tool between water mode, land mode and air mode in traveling, the method comprises the following steps of interchange conversion: 1) a land mode in which the triphibian vehicle is driven by an electric motor, and the first and second airscrew modules assemblies are housed in the first and second accommodating spaces of the triphibian vehicle, so as not to affect the vehicle traveling in the land and the structure of the vehicle; 2) the steps of converting land mode to air mode: open the cover, adjust the retractable shaft assembly, move the extension arm member having the propeller assembly out of the accommodating space to obtain the up force, the triphibian vehicle is lifted to achieve the purpose of vertical take-off or traveling in water and the third safety module is deployed from the overlapping land pattern to the flight mode to provide lift and balance and guarantee Safety; 3) converting the land mode to the water mode, the third safety airscrew module is contracted from the unfolded state to an overlapping state, the two first and second airscrew modules are stretched in the direction of the extension axis so that the radius of rotation of the vertical ground of the two first and second airscrew modules is higher than the water surface and rotated from the horizontal rotation angle to the angle perpendicular to the horizontal plane, that is, the propeller assembly is vertically rotated by a horizontal rotation to a airscrew module; 4) converting water mode or flight mode to land mode: move the two first and second airscrew modules assembly into the first and the second accommodating space of the triphibian vehicle, and close the hatch cover so that the triphibian vehicle becomes an ordinary vehicle.

The present application is characterized by 1) the triphibian vehicle is based on the structure of the ordinary car to achieve a hybrid vehicle function; 2) use the front and rear space of the triphibian vehicle body to collect the airscrew module assembly for traveling in water and air, 3) the function of the land mode, air mode and water mode are achieved by the position change of the propeller module, so that the triphibian vehicle can have a variety of ways of transport capacity; 4) the triphibian vehicle does not require the runway, which can be vertical takeoff and landing; 5. the triphibian vehicle is supplied directly from the self-powered battery with unlimited power, eliminating the need for charging and no mileage restrictions.

I claim:

1. A vehicle, such as a land and an air, comprising:
 a vehicle body having at least one accommodating space;
 a self-powered battery;
 at least one airscrew module assembly coupled to the vehicle body, the airscrew module assembly comprising:
 a retractable shaft assembly;
 an extension arm member coupled to the retractable shaft assembly; and a propeller assembly coupled to the extension arm member, wherein the airscrew module assembly is capable of rotating relative to the vehicle body to selectively rotate into or out of the accommodating space.

2. The vehicle of claim 1, further comprising a plurality of the airscrew module assemblies, wherein the vehicle body further has a plurality of the accommodating spaces respectively corresponding to the airscrew module assemblies, and each of the airscrew module assemblies is capable of rotating relative to the vehicle body to selectively rotate into or out of the corresponding accommodating space.

3. The vehicle of claim 1, the propeller assembly further comprising at least one propeller and an electrical motor, wherein the propeller coupled to the electrical motor and the electrical motor coupled to the extension arm member.

4. The vehicle of claim 1, the retractable shaft assembly further comprising a retractable rod and a base, wherein the base has at least one positioning hole and at least one positioning screw.

5. The vehicle of claim 1, wherein the airscrew module assembly is optionally disposed with a modular control system to control a movement of the airscrew module assembly; wherein the airscrew module assemblies may be disposed at different positions on the modular control system.

6. The vehicle of claim 1, wherein the extension arm member may be an assembly structure.

7. The vehicle of claim 1, wherein a propeller assembly is optionally disposed on the top of the vehicle.

8. A vehicle, such as a land and an air, comprising:
a vehicle body;
a battery power supply system;
at least one airscrew module assembly coupled to the vehicle body, the airscrew module assembly comprising:
a retractable shaft assembly;
an extension arm member coupled to the retractable shaft assembly; and
a propeller assembly coupled to the extension arm member,
wherein the airscrew module assembly is capable of extending relative to the vehicle body to selectively return to or extend out of the vehicle body.

9. The vehicle of claim 8, further comprising a plurality of the airscrew module assemblies, wherein the airscrew module assemblies are selectively disposed at different positions of the vehicle.

10. The vehicle of claim 8, a propeller assembly further comprising at least one propeller and an electrical motor, wherein the propeller coupled to the electrical motor and the electrical motor coupled to the extension arm member.

11. The vehicle of claim 8, a retractable shaft assembly further comprising a retractable rod and a base, wherein the base has at least one positioning hole and at least one positioning screw.

12. The vehicle of claim 8, wherein the airscrew module assembly is optionally disposed with a modular control system to control a movement of the airscrew module assembly; wherein the airscrew module assemblies may be disposed at different positions on the modular control system.

13. The vehicle of claim 8, wherein the extension arm member may be an assembly structure.

14. The vehicle of claim 8, wherein a propeller assembly is optionally disposed on the top of the vehicle.

15. A vehicle, such as a land and an air, comprising:
a vehicle body;
a self-powered battery;
at least one airscrew module assembly coupled to the vehicle body, the airscrew module assembly comprising:
a retractable shaft assembly;
an extension arm member coupled to the retractable shaft assembly; and
a propeller assembly coupled to the extension arm member;
wherein the airscrew module assembly is capable of extending relative to the vehicle body to selectively return to or extend out of the vehicle body.

16. The vehicle of claim 15, further comprising a plurality of the airscrew module assemblies, wherein the airscrew module assemblies are selectively disposed at different positions of the vehicle.

17. The vehicle of claim 15, the propeller assembly further comprising at least one propeller and an electrical motor, wherein the propeller coupled to the electrical motor and the electrical motor coupled to the extension arm assembly.

18. The vehicle of claim 15, wherein the airscrew module assembly is optionally disposed with a modular control system to control a movement of the airscrew module assembly; wherein the airscrew module assemblies may be disposed at different positions on the modular control system.

19. The vehicle of claim 15, wherein the extension arm member may be an assembly structure.

20. The vehicle of claim 15, wherein a propeller assembly is optionally disposed on the top of the vehicle.

* * * * *